United States Patent [19]

Pietsch et al.

[11] Patent Number: 4,965,025

[45] Date of Patent: Oct. 23, 1990

[54] PROCESS FOR MICROENCAPSULATING HYDROPHOBIC OILS, THE MICROCAPSULES OBTAINED AND THE USE THEREOF

[75] Inventors: Günter Pietsch, Isernhagen; Karl-Heinz Schrader, Hanover, both of Fed. Rep. of Germany

[73] Assignee: Papierfabrik August Koehler AG, Fed. Rep. of Germany

[21] Appl. No.: 169,630

[22] Filed: Mar. 18, 1988

Related U.S. Application Data

[63] Continuation-in-part of Ser. No. 922,591, Oct. 24, 1986, Pat. No. 4,824,823.

[30] Foreign Application Priority Data

Mar. 24, 1987 [DE] Fed. Rep. of Germany ....... 3709586

[51] Int. Cl.$^5$ ............................................. B01J 13/02
[52] U.S. Cl. ................................ 264/4.7; 428/402.21; 503/215
[58] Field of Search .................. 264/4.7; 428/402.21; 503/201, 215

[56] References Cited

U.S. PATENT DOCUMENTS

| | | | |
|---|---|---|---|
| 4,396,670 | 8/1983 | Sinclair | 264/4.7 X |
| 4,525,520 | 6/1985 | Shioi et al. | 428/402.21 X |
| 4,824,823 | 4/1989 | Pietsch et al. | 264/4.7 X |

FOREIGN PATENT DOCUMENTS

| | | |
|---|---|---|
| 0046415 | 2/1982 | European Pat. Off. . |
| 7118663 | 1/1972 | France . |

OTHER PUBLICATIONS

"Flow Measurement", Kirk–Othmer Concise Encyclopedia of Chemical Technology, 1985, p. 496.

*Primary Examiner*—Richard D. Lovering
*Attorney, Agent, or Firm*—Darby & Darby

[57] ABSTRACT

A description is given of a process for microencapsulating hydrophobic oils with color reactants of color reaction sytems dissolved therein, a cationized melamine/formaldehyde precondensate being precipitated in ultra-fine suspension from its acid aqueous solution, accompanied by vigorous stirring and by modifying the solubility conditions, said suspension is mixed under vigorous stirring with a hydrophobic oil containing the color reactants in dissolved form, the oil-in-water dispersion obtained is adjusted acid and an aqueous solution of a water-soluble, nonionic melamine/formaldehyde precondensate is added, accompanied by stirring, for forming the microcapsule envelope. For stabilizing the oil-in-water dispersion, the pH-value of the acid, aqueous solution of a cationized melamine/formaldehyde precondensate which, in the weak acid, neutral and alkaline, aqueous use range is present in insoluble, cationizable form, is raised in the absence of water-soluble, organic polymers by the addition of Bronsted bases and accompanied by vigorous stirring to such an extent that the cationizable melamine/formaldehyde precondensate is precipitated in ultra-fine suspension as a result of the modified solubility conditions. The possible elimination of the water-soluble, organic polymers is economically advantageous.

18 Claims, No Drawings

PROCESS FOR MICROENCAPSULATING HYDROPHOBIC OILS, THE MICROCAPSULES OBTAINED AND THE USE THEREOF

This application is a continuation-in-part of Ser. No. 922,591, filed Oct. 24, 1986, now U.S. Pat. No. 4,824,823.

The invention relates to a process for microencapsulating hydrophobic oils with colour reactants of colour reaction systems dissolved therein, a cationized melamine/formaldehyde precondensate being precipitated in ultra-fine suspension from its acid aqueous solution, accompanied by vigorous stirring and by modifying the solubility conditions, said suspension is mixed under vigorous stirring with a hydrophobic oil containing the colour reactants in dissolved form, the oil-in-water dispersion obtained is adjusted acid and an aqueous solution of a water-soluble, non-ionic melamine/formaldehyde precondensate is added, accompanied by stirring, for forming the microcapsule envelope.

BACKGROUND OF THE INVENTION

Many different processes are known for the microencapsulation of hydrophobic oils, particularly with colour formers of colour reaction recording systems dissolved therein. The thus obtainable microcapsules, which as a rule contain an oily hydrophobic solution of the colour former (a homogeneous substance) are generally applied in conventional manner to the underside of a sheet of paper, the CB sheet. The latter can be brought into contact with a so-called CF sheet, in which the surface facing the CB sheet is coated with a reactant which is acid for the colour former. The acid reactant can e.g. be an acid-treated clay, such as montmorillonite clay, or also a low molecular weight phenolic resin, such as a phenol formaldehyde novolak resin. If the acid reactant is an acid compound soluble in oily hydrophobic liquids, then it can also be encapsulated. During the printing process, the said capsules are crushed by the printing types. Therefore the reactants come into contact with one another and supply a coloured character on the CF sheet. The two colour reactants can also be applied to the surface of a single sheet, in order to obtain a so-called autogenic system. It is then recommended to encapsulate both reactants, if the acid reactant is soluble in the oil, in order to prevent an undesired premature reaction of the reactants.

For the production of capsule envelopes of microcapsules provided for duplication purposes in colour reaction systems, numerous encapsulation processes are known. They are e.g. based on the use of gelatin coacervate, polyisocyanate, polyamide or aminoplast systems. The aforementioned process is based on an aminoplast system, in which a water-soluble, non-ionic melamine/formaldehyde precondensate is reacted with a water-soluble polymer reactive therewith, accompanied by the formation of the capsule envelope. Increasing significance has been attached to this process of late. It can be relatively easily controlled and takes place under comparatively mild reaction conditions, so that even very sensitive colour formers remain undamaged during the reaction.

German Patent 35 45 803, which corresponds to U.S. patent application Ser. No. 922,591, now U.S. Pat. No. 4,824,823, describes a process of the aforementioned type in detailed form. This process leads to a particularly stable oil-in-water dispersion, in that the aqueous solution of a cationic melamine/formaldehyde precondensate and that of an organic polymer are mixed, accompanied by vigorous stirring, in order to bring about optimum turbulence and the exclusion of disturbing laminar conditions. As a result the originally dissolved, cationized melamine/formaldehyde precondensate is separated in ultra-fine suspension in the presence of a water-soluble polymer. These precipitated ultra-fine suspended particles leads to a particularly favourable stabilization of the oil-in-water dispersion, in which the capsule envelope is formed by condensation reactions with the water-soluble non-ionic melamine/formaldehyde precondensate as the main reactant.

The process described in German Patent 35 45 803 uses a water-soluble polymer in the first process stage, which is believed to interact with the cationic melamine precondensate to induce precipitation of the precondensate in ultra-fine suspension. It is to be assumed that this interaction is based on the presence of suitable and in particular Zerewitinoff-active hydrogen atom-carrying functional groups in the polymer. Such functional groups, which react with the melamine/formaldehyde precondensate, have long been known and in particular include acid amide amino imino ester ether hydroxyl urethane thiol or mercaptan groups. Preferred examples of the water-soluble polymers are polyvinyl alcohol, gelatin and maleic anhydride copolymers, particularly ethylene/maleic anhydride copolymers or styrene/maleic anhydride copolymers. Particular preference is given to acrylamide/acrylic acid copolymers, starch, cellulose derivatives such as carboxymethyl cellulose (CMC) or hydroxyethyl cellulose (HEC), alginates, such as sodium alginate, polyurethanes and polyethylene oxide. The acrylamide/acrylic acid copolymer has proved especially advantageous as a water-soluble organic polymer in this process, but constitutes a significant cost factor in the overall process of German Patent 35 45 803.

SUMMARY OF THE INVENTION

According to German patent 35 45 803 it was at first believed that it is not possible to do without the water-soluble polymer during the precipitation of the previously cationized melamine/formaldehyde precondensate. However, it has surprisingly been found that the need for the water-soluble polymer can be obviated by using a cationic or cationizable melamine/formaldehyde precondensate which is water-insoluble in the weak acid, neutral and alkaline range, which is only soluble by protonization in a significantly acidified aqueous medium and by raising the pH-value of this relatively acid, aqueous medium by adding Bronsted bases, accompanied by vigorous stirring, in which optimum turbulence is obtained, whilst excluding disturbing laminar conditions, to the extent that this specific melamine/formaldehyde precondensate is precipitated in ultrafine suspension.

Therefore the present invention relates to a process of the aforementioned type, which is characterized in that for stabilizing the oil-in-water dispersion, the pH-value of the acid, aqueous solution of a cationized melamine/formaldehyde precondensate which, in the weak acid, neutral and alkaline, aqueous use range is present in insoluble, cationizable form, is raised in the absence of water-soluble, organic polymers by the addition of Bronsted bases and accompanied by vigorous stirring to such an extent that the cationizable melamine/formaldehyde precondensate is precipitated in ultra-fine suspension as a result of the modified solubility conditions.

Thus, the essence of the inventive process is based on the use of two different melamine/formaldehyde precondensates, whereof one, namely the water-insoluble cationizable melamine/formaldehyde precondensate is precipitated under the described conditions in ultra-fine suspension and whereby said suspended particles are the reason for the particular stabilization of the subsequent oil-in-water dispersion or emulsion. The further starting materials and process parameters are subject to very wide fluctuations within the scope of the known procedure based on the condensation reaction of melamine/formaldehyde precondensates and in particular based on the process known from German Patent 35 45 803. Thus, the following description only covers a preferred procedure with respect to the generally known process quantities.

DETAILED DESCRIPTION OF THE INVENTION

Of importance for the inventive process or for the stabilization of the oil-in-water dispersion or emulsion, in which is formed the envelope of the microcapsules, is a cationizable melamine/formaldehyde precondensate, which cannot be dissolved in water in the use concentration range described hereinafter. Thus, it is a cationizable melamine/formaldehyde precondensate, which is not soluble in the neutral pH-range and above and in particular at a pH-value of approximately 5 and above in water, so that the term "water-insoluble" can be used. This term "water-insoluble" is completely adequate to enable the Expert to realize the present invention. This or comparable terms are used in the relevant chemical reference works, i.e. not only "water-insoluble", but also "slightly water-soluble" and the like, as can be gathered e.g. from D'Ans Lax, "Taschenbuch für Chemiker und Physiker", vol. II, Org. Verbindungen, 1964, pp.2–57.

In order to dissolve the water-insoluble, cationizable melamine/formaldehyde precondensate to be used for the purposes of the invention and to thereby convert it into its cationized or protonized, soluble form, it is preferably introduced into a relatively strong acid solution, e.g. a solution with a pH-value of approximately 3.5 or less. At this pH-value and below, a solution can also be kept for a long time. If the pH-value is raised to approximately 3.5 to 4.5, then the stability decreases, because the electrostatic repulsion is increasingly removed by the withdrawal of protons and a self-condensation occurs. If the pH-value is raised to approximately 4.5 and in particular to approximately 5.0 and above, this leads to a substantially quantitative precipitation of the water-insoluble, cationizable melamine/formaldehyde precondensate. Within the scope of the present invention, the pH-value is appropriately raised as rapidly as possible, so that the originally dissolved cationized melamine/formaldehyde precondensate is precipitated without any self-condensation, whilst making use of conventional Brønsted bases.

It has surprisingly been found that with the aid of an ageing process of the acid, aqueous solution of the cationized melamine/formaldehyde precondensate, an excellent control mechanism for the oil droplets or capsule diameter is provided. On using unaged, freshly prepared solutions for forming the precipitate stabilizing the emulsion, then capsules with a relatively small diameter are obtained. Conversely capsules with a much larger diameter are obtained if the precipitation process stabilizing the emulsion is carried out with a solution of the cationized melamine/formaldehyde precondensate aged for several hours.

When reference is made to "Brønsted bases", this covers the standard term by definition. Thus, they are compounds which are able, through the addition of protons, to adequately raise the pH-value for precipitating the melamine/formaldehyde precondensate. The Brønsted bases can be constituted by virtually all known bases, obviously excluding those which impair the capsule wall formation mechanisms. Of particular advantage are the standard aqueous solutions of bases and in particular the aqueous solution of sodium hydroxide or potassium hydroxide.

The precipitation of the specific water-insoluble, previously cationized melamine/formaldehyde precondensate is not in itself adequate for the purposes of the invention and instead said precipitation must be accompanied by vigorous stirring. An explanation of what is meant by "vigorous stirring" has already been given in the discussion of the prior art in German Patent 35 45 803. See also U.S. application Ser. No. 922,591, now U.S. Pat. No. 4,824,823. Vigorous stirring ensures that the cationizable melamine/formaldehyde precondensate is precipitated in ultra-fine suspension. Only in this form is the precipitation product suitable for bringing about dispersion stabilization in the subsequent process sequence.

As a result of the described procedure, i.e. through the rapid raising of the pH-value accompanied by vigorous stirring, the melamine/formaldehyde precondensate originally dissolved in the acid medium is now precipitated neutral. In the case of optimum realization of the inventive process, its particle size is between approximately 0.1 and 1.5 micrometers. If the precipitated melamine/formaldehyde precondensate particles are in this size range, then during the further process sequence they lead to a particularly marked stabilization of the emulsion obtained by adding the hydrophobic solution of the colour former or some other reactant. When performing the invention for achieving the sought emulsion stabilization, the melamine/formaldehyde precondensate marketed under the trade name Madurit MW 150 ® is particularly advantageous.

Various requirements are made on the nonionic melamine/formaldehyde precondensate. It must firstly be water-soluble and must also have a reduced self-reactivity. The reduction of the reactivity can be brought about by an at least partial blocking of the active methylol groups, suitable processes being known (cf. Kunststoffhandbuch, Vol. X, Duroplaste, p.173). Thus, the desired reactivity of the nonionic (oligomeric) melamine/formaldehyde precondensate can be adjusted by partial methylation. European Patent 26 914 describes a product containing e.g. per mol of melamine, 5.25 mol of formaldehyde and 2.3 mol of methylether groups. These requirements are essentially satisfied by the commercially available products Madurit MW 112 ® of Cassella AG (cf. "Kunstharze Hoechst, Technisches Merkblatt" September 1982 edition), BC 336 ® of BIP Chemicals Ltd and Resin 42 - 91 ® of Rousselot GmbH.

Through reducing the reactivity of the nonionic melamine/formaldehyde precondensate, it is ensured that the encapsulation process does not take place too rapidly. This forces back or even avoids an undesired agglomerate formation or the flocculation of larger particles. During the subsequent printing process with the correspondingly produced printing paper, agglomerates or larger particles lead to disadvantageous phenomena, such as unclear script or writing. Nonionic, methylated melamine/formaldehyde precondensates of the aforementioned degree of methylation generally have the desired reactivity and are therefore preferred within the scope of the invention. However, for the purposes of the invention, it is also possible to use varyingly reactive nonionic melamine/formaldehyde precondensates. It can be advantageous in individual cases to control the reactivity of the available nonionic melamine/formaldehyde precondensate, which can be brought about by adding formaldehyde. The use concentration of the aqueous solution of the nonionic melamine/formaldehyde precondensates is preferably at the high concentration of approximately 20 to 40% by weight and in particular approximately 30% by weight.

The special water-insoluble, cationic or cationizable melamine/formaldehyde precondensate used within the scope of the invention differs, from the nonionic melamine/formaldehyde precondensate with regards to function during the performance of the process. The water-insoluble, cationizable melamine/formaldehyde precondensate in the precipitated form mainly serves for emulsion stabilization, whilst the latter builds up the capsule wall. Whereas in the case of the non-ionic melamine/formaldehyde precondensate the reactivity is reduced to an optimum value, e.g. by methylation, it is comparatively high in the case of the cationizable melamine/formaldehyde precondensate. The active methylol groups of the cationic melamine/formaldehyde precondensate consequently preferably have their full reactivity and are not blocked, e.g. by methylation. It is therefore preferably substantially free from methylol ether groups, i.e. it is not partly methylated, etc.

The concentration of the cationizable melamine/formaldehyde precondensate in aqueous solution is, in the case of standard commercial products, generally in the range approximately 2 to 12% by weight, preference being given to a value of approximately 4 to 8% by weight and especially approximately 8% by weight. As stated, the pH-value thereof is preferably approximately 1.5 to 3.0. The solution e.g. contains approximately 1 to 10% of acids (such as e.g. formic, hydrochloric, sulphuric or phosphoric acid).

The hydrophobic oil, in which are dissolved the colour former or its acid reactants, if it is a soluble compound (e.g. a phenolic compound), constitutes a hydrophobic material which is inert with respect to water, i.e. it is substantially insoluble and not miscible with water. A low solubility can be ignored. Preferred examples of oils, which can be inventively used as solvents for the colour reactants are in particular partly hydrogenated terphenyls, chloroparaffins, alkylated diphenyls, alkylphthaline, diarylmethane derivatives, dibenzyl benzene derivatives, alkanes, cycloalkanes and esters, such as phthalates, adipates, trimellitates and phosphates.

It is possible to use many different colour formers described in detail in the literature for dissolving in the hydrophobic oils and for encapsulation, examples being lactone phthalide fluoran diphenylamine spiropyran auramine phenothiazine aminophenyl pyridine and amino diazaxanthene lactone derivative, particularly crystal violet lactone and N-benzoyl-leucomethylene blue.

When performing the invention, it has been found that particularly favourable capsules are obtained if a water-soluble, macromolecular substance is added following the formation of the suspension of the precipitated, cationic melamine/formaldehyde precondensate. This addition should be terminated at the latest as the wall material forms. The term "water-soluble, macromolecular substance" is based on the definition known to the Expert. This macromolecular substance can therefore be the water-soluble, organic polymer described above in conjunction with the discussion of German Patent 35 45 803.

The water-soluble, macromolecular substance prevents the undesired agglomeration of the formed microcapsules. Water-soluble, macromolecular substances fulfilling this function are in particular inorganic macromolecular compounds, such as e.g. water-soluble polyphosphates. On using the water-soluble organic polymers described above and in German Patent 35 45 803 for preventing agglomerate formation following the formation of the aforementioned stabilizing suspension, only a comparatively small amount is required, which is economically very advantageous. Thus, there is e.g. preferably only approximately 0.5 parts by weight of said compound group for approximately 0.05 to 1.5 parts by weight of water-insoluble, cationizable melamine/formaldehyde precondensate, which also applies with respect to the other macromolecular substances which can be considered. Thus, the quantity is much lower than that used in the process of German Patent 35 45 803 in the first process stage of forming the suspension of the precipitated, cationizable melamine/formaldehyde precondensate. The addition of the organic, macromolecular compounds is excluded in the first process stage (suspension formation) within the scope of the present invention, because it is already referred to in German Patent 35 45 803 U.S. application Ser. No. 922,591, now U.S. Pat. No. 4,824,823 although not in connection with preventing agglomerate formation, but as a necessary measure for precipitating the cationizable melamine/formaldehyde precondensate.

According to the invention, the aforementioned, but not absolutely necessary water-soluble, macromolecular substances are e.g. used in an approximately 2 to 15% by weight aqueous solution, particular preference being given to the range approximately 5 to 7% by weight. This can take place by normal stirring in. The indicated concentrations are dependent on the type of material used and can consequently fluctuate correspondingly.

The last-mentioned concentrations in particular apply to an acrylic acid-acrylamide copolymer (comprising approximately 20 to 50% acrylic acid and approximately 80 to 50% acrylamide with a molecular weight of approximately 200,000 to 800,000). Excellent results with regards to storage stability and migration resistance for the microcapsules obtained are obtained with a water-soluble copolymer of approximately 30% acrylic acid and approximately 70% acrylamide groups with an average molecular weight of approximately 400,000. Excessive concentrations of the water-soluble polymer are discouraged as a result of the associated viscosity problems. However, they can be reduced despite a relatively high concentration if the particular polymer has a comparatively low molecular weight. Thus, with respect to the proven, water-soluble, organic polymers the optimum concentration in each case should be determined with a view to the different requirements by tests.

The weight ratios in which the two prescribed aqueous solutions of the two different melamine/formaldehyde precondensates are used when performing the inventive process are not critical and can be subject to wide fluctuations. The Expert can establish the optimum ratios as a function of the nature of the materials used and their concentration in the particular aqueous medium within the framework of suitable preliminary tests and without significant effort and expenditure. The following examples provide ratios and conditions of an appropriate type, according to which preferably approximately 1 part by weight of an approximately 16% by weight aqueous acid solution of the cationized melamine/formaldehyde precondensate is used for approximately 2 parts by weight of an approximately 32% by weight aqueous solution of the nonionic melamine/formaldehyde resin, the latter preferably additionally containing approximately 6.5 parts by weight of an approximately 4.5% aqueous solution of the macromolecular substance. In the preferred realization of the inventive process, in which a water-soluble, macromolecular substance is used in the indicated process stages, the preferred weight ratio of water-soluble macromolecular substance to nonionic melamine/formaldehyde precondensate is appropriately in the range approximately 0.003:10 to 3:1.

The aforementioned explanations concerning the reaction sequence, on which the inventive process is based, are based on the general teachings of aminoplast chemistry and which are well known to the Expert.

For a successful performance of the inventive process, it is important that during the precipitation of the cationized melamine/formaldehyde precondensate from the acid aqueous starting solution by raising the pH-value and also during the mixing of said medium with the hydrophobic oil containing the colour reactants in dissolved form, working takes place with vigorous stirring. Thus, stirring or mixing must take place with a highly efficient dispersing apparatus, in order to achieve optimum turbulence and whilst preventing laminar conditions. Appropriate information on the turbulence is obtained through the Reynolds number, which is preferably over approximately 10,000. For the purposes of the invention, the high performance dispersing equipment based on the stator/rotor system has proved to be particularly advantageous. This system has stator plates and rotor disks and acts in the same way as a centrifugal turbine.

In one of the preferred dispersing means of the aforementioned type the construction is as follows. The stator plates have circles of holes, through which the mixing material flows in the axial direction. These holes are arranged in countersunk manner in ring-like channels arranged symmetrically on either side of the stator plate. The flanks of these channels are provided with a specially constructed tooth sYstem. The shear pins of the rotor disks also arranged in ring-like manner run in the channels. The shear fields through which flow the mixing material are alternately formed by the toothed flanks of the stator channels with the longitudinal edges of the rotor pins and by the end face of the rotor pins with the edges of the holes of the stator channels Accompanied by the formation of high frequency, intense impingement, frictional and shearing effects, the mixing material is constantly broken up into a plurality of individual flows and then combined again. Such multifrequency liquid mixtures have a high mixing capacity for short residence times and ensure the precise mixing in of small additions of substances. Whilst avoiding prejudicial dead spaces, the internal volume is kept very small. High momentum values and a powerful mechanical effect also leads to a fine dispersion of the material without excessive speeds. Large contact surfaces in the mixing chambers ensures the most intimate contact between the different components.

However, there are also high performance dispersing means, which are suitable for batchwise operation and which are also based on the aforementioned stator/rotor system. One medium to be mixed is inserted first, stirred with the high efficiency disperser and the liquid component to be admixed is fed into the liquid cone formed through the operation of said disperser. In a fraction of a second the mixing point is drawn into the turbulence zone within the high efficiency disperser as a result of the flow conditions present and the sought dispersion is performed there.

The aforementioned high performance dispersers are only to be looked upon as preferred examples. For the purposes of the invention, it is also possible to use other high efficiency dispersers, which are based on a different principle, provided that they lead to the same sought dispersing result. Thus, it is important that dispersers are used, which develop adequately high shear forces in order to permit the necessary optimum turbulence, whilst substantially avoiding laminar flow conditions. This is also possible with recently developed dispersers, in which high pressure actions are used in conjunction with cavitation actions.

When performing the inventive process using the aforementioned starting materials, preferably the following procedure is adopted. An approximately 5 to 20 and preferably approximately 6% by weight acid (pH-value approximately 2.5) aqueous solution of the cationized melamine/formaldehyde precondensate is mixed in a high efficiency disperser, under vigorous stirring with such a quantity of an approximately 1N aqueous sodium hydroxide solution, that the pH-value of the aqueous mixture obtained is raised to more than approximately 4.5 and in particular to approximately 5.0 to 7.0. Neutral (cationizable) melamine/formaldehyde precondensate is precipitated as ultra-fine particles with a size of approximately 0.1 to 1.5 micrometers. The complete mixing and precipitation process takes place in a fraction of a second or is performed instantaneously. Precipitation is made apparent as cloudiness and this can be detected colloidally to microscopically, as a function of the particle diameter. This can be directly followed, accompanied by vigorous stirring using a high efficiency disperser of the aforementioned type, by the admixing of the hydrophobic phase containing the colour reactants in dissolved form.

The sought oil droplet diameter is between 2 and 10 and preferably between 4 and 6 micrometers. This oil droplet diameter favours a uniform behaviour of the colour reaction systems produced by means of the microcapsules obtained and in particular the colour reaction recording papers. The particular chosen ratio of the oil phase to the solids fraction of the aqueous phase is not critical. Generally this weight ratio is approximately 2:1 to 20:1, particularly approximately 5:1 to 10:1.

After or before admixing the oil phase, the mixture or the oil-in-water dispersion is adjusted acid with a view to the condensation reaction taking place during the subsequent formation of the capsule envelope and which is catalyzed by acids. It is possible to use organic or inorganic acids, provided that they have an adequate acidity and lead to no disturbing secondary effects, particularly having no disadvantageous influence on the colour formers dissolved in the hydrophobic oil. Therefore, preference is given to the use of acetic, formic, citric, hydrochloric and sulphuric acids. The optimum pH-value for the condensation reaction is generally in the weak acid range, particularly between 3 and 6. Particular preference is given to the range of 3.5 to 5. Excessive pH-values extend the reaction time, whilst inadequate pH-values are disadvantageous from several standpoints, e.g. can lead to an at least slightly undesired dissolving of the precipitated, cationizable melamine/formaldehyde precondensate. An inadequate pH-value can also lead to an undesired premature discolouration of the colour former in the microcapsule. The condensation reaction can also take place too fast, so that the disadvantageous agglomerate formation or the formation of larger particles occurs.

in the mixture prepared in the aforementioned manner is now stirred the aqueous solution of the nonionic melamine/formaldehyde precondensate. It is possible to use for this purpose conventional stirring means having no special stirring or turbulence effects. The previously mentioned high efficiency dispersers should not be used here, because they would disturb the formation of the capsule envelope through the condensation reaction of the nonionic melamine/formaldehyde precondensate, optionally also using a water-soluble, macromolecular substance.

The aforementioned starting materials are ultimately in the form of a reactive oil-in-water dispersion or emulsion, in which the formation of the envelope of the microcapsules takes place under normal stirring for approximately 1 to 5 hours and in particular approximately 2 to 3 hours. This oil-in-water dispersion or emulsion is completely stable, which can be attributed to the cationic melamine/formaldehyde precondensate of the described type and which is present as an ultra-fine suspension.

As the aforementioned condensation reactions leading to the formation of the microcapsule wall take place in accelerated manner accompanied by heat supply, it can be desirable to control or regulate the temperature of the individual process stages, e.g. by heating.

After the formation of the reaction medium, its temperature is generally initially raised to approximately 55° C. in order to optimize the condensation reaction and therefore the formation of the wall of the microcapsules. This process is generally approximately concluded after two hours reaction at approximately 55° C., in the case of the aforementioned preferred pH-value ranges. At a temperature of less than approximately 55° C., microcapsules of adequate quality are regularly obtained but, as stated, a longer reaction period is necessary. It is also possible to operate at temperatures which are above or below 55° C. The particularly favourable reaction temperature for the individual case can be readily established by means of routine tests.

it is also possible to add further additives to the reaction medium, e.g. an ammonium salt, such as ammonium chloride, which accelerates the condensation reaction in some cases.

When the condensation reaction has taken place to the desired extent, the pH-value is adjusted neutral or weak alkaline by adding alkalis, particularly sodium hydroxide, potassium hydroxide or ammonium hydroxide. This largely prevents any further reaction, which during the storage of the microcapsules could lead to agglomerate formation. The corrosion influence of the acid medium on the reaction vessels is also removed. When using ammonium hydroxide, any free formaldehyde present is largely removed from the reaction system as an odourless addition compound.

The inventive process can be performed batchwise, but also continuously. In the continuous procedure, the suspension obtained with a high efficiency disperser by mixing the acid aqueous solution of the water-insoluble cationic melamine/formaldehyde precondensate and the aqueous solution of the Bronsted base, particularly aqueous caustic soda solution, is immediately there after mixed with the oil phase containing the colour reactants by means of another high efficiency disperser and then passed into a stirred vessel cascade, in which the condensation reaction takes place. The aqueous solution of the nonionic melamine/formaldehyde precondensate is dosed into the first stirred vessel. It is advantageous to initially introduce the reaction mixture into a larger stirred vessel. As soon as the latter is full, the fresh reaction medium is passed into a second stirred vessel, whilst the reaction is concluded in the first stirred vessel. The finished capsule dispersion is removed. It is then possible to introduce further fresh reaction medium, whilst the capsule formation reaction takes place in the second stirred vessel. This continuous process should only be looked upon as an example and numerous modifications are clearly possible.

The particular advantages of the inventive process are that, apart from the extremely favourable stabilization of the reaction system, which can be attributed to the precipitated, water-insoluble, cationizable melamine/formaldehyde precondensates contained in the reaction medium in ultra-fine suspension, the desirable characteristics of the microcapsules are retained. They have a very satisfactory tightness, which can be proved by standard tests. It is not necessary for the advantageous stabilization of the reaction medium to use expensive macromolecular substances and in particular expensive water-soluble, organic polymers. This is an important economic advantage. It is appropriate in individual cases to add a reduced quantity of water-soluble macromolecular substance in a suitable process stage (whilst excluding the addition of water-soluble, organic polymers in the first process stage), in order to substantially exclude a possible undesired agglomerate formation. As a result of the reduction of the quantity used of these additional substances as compared with the higher quantities needed in the process of German Patent 35 45 803, the inventive process is also here advantageous from the economic standpoint. The inventively obtained capsule dispersion can, as a result of its excellent characteristics, be directly applied to acid acceptor papers, without undesired discolourations occurring. The inventive process can be easily and reliably controlled. The dispersion-stabilizing or emulsion-stabilizing action takes place within fractions of a second.

The invention is explained in greater detail hereinafter by means of examples.

EXAMPLE 1

Immediately following preparation and accompanied by vigorous stirring by means of a high efficiency disperser based on the rotor/stator principle, 50 parts by weight of an acid aqueous solution containing 6 parts by weight of a cationized melamine/formaldehyde precondensate and 1.5 parts by weight of formic acid and having a pH-value of 2.5 are mixed with 200g of a 0.5 % caustic soda solution, whereby the pH-value is raised to 5.5, which leads to a quantitative precipitation of the cationizable melamine/formaldehyde precondensate, so that a turbid suspension is formed. Accompanied by vigorous stirring by means of a high efficiency disperser, to it is added the solution of the colour former mixture in a mixture of 90 parts by weight of chloroparaffin (chlorine content 42%, average carbon number 17) and 90 parts by weight of dodecylbenzene (extender). The colour former comprises 3.8 parts by weight of crystal violet lactone (primary colour former) and 1 part by weight of N-benzoylleucomethylene blue (secondary colour former). This is followed, accompanied by normal stirring, by the addition of 26 parts by weight of a 20% by weight aqueous solution of formic acid, in order to adjust the pH-value of the system to 4.2. Then, accompanied by normal stirring, the solution of 50 parts by weight of nonionic melamine/formaldehyde precondensate (Madurit MW 112 ®) is mixed into 50 parts by weight of water. The mixture, which is at room temperature, is now slowly heated to approximately 55° C. This system is maintained in reaction for approximately 3 hours and then cooling to room temperature takes place. The pH-value is then adjusted to approximately 9 by adding aqueous concentrated ammonia solution (25% by weight), so that simultaneously excess formaldehyde is combined. Capsules with an average particle size of approximately 4 to 7 micrometers, with a high tightness and without agglomerate formation are obtained. When used in reaction recording papers, they lead to excellent written characters.

EXAMPLE 2

Example 1 is repeated with the modification that, after forming the emulsion, 60g of a 20% solution of a water-soluble polymer of the acrylic acid-acrylamide copolymer type (comprising approximately 30% acrylic acid and approximately 17% acrylamide) are mixed in. As a result of this additional measure, it is always ensured that there is no agglomerate formation, which is disadvantageous in various reaction recording papers.

EXAMPLE 3

Example 1 is repeated with the modification that, after following the emulsion, 20g of a 20% solution of a water-soluble polymer of the acrylamide-sodium styrene sulphonate type are added.

EXAMPLE 4

50 parts by weight of an acid aqueous solution containing 3 parts by weight of cationized melamine/formaldehyde precondensate resin and 1 part by weight of formic acid are stirred for 3 hours at room temperature and then further processed as described in Example 1. The average particle diameter of the capsules obtained is between 5 and 10 microns.

We claim:

1. A process for microencapsulating hydrophobic oils within a microcapsule envelope in an aminoplast system, comprising the steps of:
    preparing a first strongly acidic aqueous solution of a cationic melamine/formaldehyde precondensate that is water insoluble under weak acid, neutral and alkaline conditions,
    stirring said first acidic aqueous solution under highly turbulent conditions,
    instantaneously precipitating said cationic melamine/formaldehyde precondensate as a very fine solid suspension, by decreasing the acidity of said first acidic aqueous solution during said highly turbulent stirring and in the absence of a water-soluble polymer,
    adding a hydrophobic oil containing a color reactant in solution, with highly turbulent stirring, to rapidly form a stable oil-in-water dispersion of said oil in said aqueous solution,
    acidifying the oil-in-water dispersion thus obtained and adding a second aqueous solution of a water-soluble non-ionic melamine/formaldehyde precondensate, with laminar stirring, and
    condensing said non-ionic melamine/formaldehyde precondensate to form the microcapsule envelope, thereby encapsulating said dispersed oil.

2. A process according to claim 1, wherein said first aqueous solution is an approximately 2 to 12% by weight solution of cationic melamine/formaldehyde precondensate having an initial pH of less than approximately 3.5.

3. A process according to claim 2, wherein the pH is from 1.5 to 3.0.

4. A process according to claim 1, wherein the decrease in acidity during the precipitating step is sufficient to provide precipitation of substantially all of said cationic melamine precondensate.

5. A process according to claim 4, wherein said decrease in acidity corresponds to an increase in pH-value of the acidic aqueous solution of the cationic melamine/formaldehyde precondensate to a value of more than approximately 4.5.

6. A process according to claim 5, wherein said pH is increased to a value of approximately 5.0 to 7.0.

7. A process according to claim 1, wherein said cationic melamine/formaldehyde precondensate is free of methylolether groups.

8. A process according to claim 1, wherein said stirring step is performed immediately after said preparing step, and said precipitating step is performed immediately after said stirring step commences.

9. A process according to claim 1, wherein said acidic aqueous solution of a cationic melamine/formaldehyde precondensate having a low molecular weight, is aged for several hours before said stirring step.

10. A process according to claim 1, wherein said non-ionic melamine/formaldehyde precondensate is partly methanol etherified.

11. A process according to claim 1 wherein said highly turbulent stirring is at a Reynolds Number of at least 10,000.

12. A process according to claim 11, wherein said highly turbulent stirring is effected by a high-performance dispersing apparatus based on the rotor/stator principle.

13. A process according to claim 1, wherein said acidifying step is performed immediately after the dispersion is formed during said adding step.

14. A process according to claim 1 wherein a water-soluble macromolecular substance is added after said precipitating step and prior to said condensing step.

15. A process according to claim 14, wherein the macromolecular substance is added in a quantity such that for approximately 0.05 to 1.5 parts by weight of cationic melamine/formaldehyde precondensate there are approximately 0.5 parts by weight of water-soluble macromolecular substance.

16. A process according to claim 14, wherein the macromolecular substance is a water-soluble organic polymer.

17. A process according to claim 14, wherein the macromolecular substance is a water-soluble inorganic polymeric compound.

18. A process according to claim 1, wherein said acidifying step is performed several hours after the dispersion is formed during said adding step.

* * * * *